(12) United States Patent
Dasilva et al.

(10) Patent No.: US 7,434,313 B2
(45) Date of Patent: Oct. 14, 2008

(54) METHOD FOR REPAIRING A TURBINE ENGINE VANE ASSEMBLY AND REPAIRED ASSEMBLY

(75) Inventors: Paul D. Dasilva, Middletown, OH (US); Timothy Lee Siebert, Cincinnati, OH (US); Gregory Matthew Ford, Cincinnati, OH (US)

(73) Assignee: General Electric Company, Schnectady, NY (US)

( * ) Notice: Subject to any disclaimer, the term of this patent is extended or adjusted under 35 U.S.C. 154(b) by 383 days.

(21) Appl. No.: 11/315,553

(22) Filed: Dec. 22, 2005

(65) Prior Publication Data
US 2007/0147991 A1 Jun. 28, 2007

(51) Int. Cl.
*B23P 6/00* (2006.01)
*F01D 9/00* (2006.01)

(52) U.S. Cl. .............. 29/889.1; 415/209.4; 415/210.1; 29/402.01

(58) Field of Classification Search ............. 415/208.1, 415/208.2, 209.2, 209.3, 209.4, 210.1; 29/402.01, 29/402.03, 402.04, 402.06, 402.07, 402.14, 29/557, 889.1, 889.21, 889.22

See application file for complete search history.

(56) References Cited

U.S. PATENT DOCUMENTS

| 4,305,697 | A | 12/1981 | Cohen et al. |
| 5,758,416 | A | 6/1998 | Reverman et al. |
| 6,354,797 | B1 * | 3/2002 | Heyward et al. ............ 415/191 |
| 7,172,389 | B2 * | 2/2007 | Hagle et al. .............. 415/209.2 |

OTHER PUBLICATIONS

Co-Pending U.S. Appl. No. 10/989,791, Hagel et al.

* cited by examiner

*Primary Examiner*—Edward Look
*Assistant Examiner*—Asefeh Hemmati
(74) *Attorney, Agent, or Firm*—William Scott Andes

(57) ABSTRACT

A repaired turbine engine stationary vane assembly, including at least one airfoil bonded between inner and outer bands, is provided by a method of providing first and second vane assembly members bonded at respective circumferential edges, for example by brazing or welding. The first vane assembly member includes the outer band, the airfoil, an inner flange, and a first segment of the inner band with a first edge, spaced from the flange and extending between and through inner band circumferential edge portions. The second vane assembly member includes a second segment of the inner band including a second edge of shape and size matched with the first edge and extending through the inner band circumferential edge portions.

6 Claims, 3 Drawing Sheets

METHOD FOR REPAIRING A TURBINE ENGINE VANE ASSEMBLY AND REPAIRED ASSEMBLY

BACKGROUND OF THE INVENTION

This invention relates to the repair of turbine engine components, and, more particularly to the repair of a damaged gas turbine engine stationary vane assembly.

Stationary vane assemblies for use in the hot operating turbine section of a gas turbine engine typically are subjected to excessive wear or damage during engine operation or damaged during manufacture. Such an article, sometimes referred to as a turbine nozzle or turbine nozzle assembly, typically includes at least one airfoil as well as passages and openings for air-cooling. During engine service operation in such engine location, the stationary vane assembly experiences high temperature, strenuous environmental conditions. As a result, damage can occur to the extent that repair or replacement of the assembly is required for safe, efficient operation. As is well known in the art, such air-cooled turbine components are relatively expensive to manufacture because they are complex in design and made of relatively expensive materials, for example high temperature superalloys. Therefore, it has been a practice to repair rather than to replace such a component.

Reports of methods and apparatus for repair of turbine engine stationary vane assemblies include U.S. Pat. No. 4,305,697—Cohen et al. (patented Dec. 15, 1981) and U.S. Pat. No. 5,758,416—Reverman et al. (patented Jun. 2, 1998). During the repair of such a turbine vane assembly, it is important to maintain the relative positions of assembly members such as the airfoils and the spaced-apart inner and outer bands between which the airfoils are secured. In one type of such repair, the inner and outer bands and the airfoils first are disassembled for the repair and/or replacement of such individual members. In that repair, re-assembly of new or repaired members to provide a repaired assembly is similar to original manufacture of the vane assembly. It includes joining of the ends of individual airfoils to the spaced-apart bands, for example by brazing or welding about airfoil end stubs, while all of such members are maintained in accurate relative positions. Such a repair can provide a number of joints with joint construction not originally designed into the article. In another type of repair, joints are at or in the vicinity of a structural support such as a flange.

It is desirable to provide a method for repairing a turbine engine stationary vane assembly that requires, in combination, a reduced number of members, joints particularly away from structural supports, and repair steps to result in a repaired assembly with enhanced structural integrity in that portion of a band adjacent the airfoil.

BRIEF SUMMARY OF THE INVENTION

The present invention, in one form, provides a method for repairing a turbine engine stationary vane assembly comprising an outer band, an inner band radially spaced apart from the outer band and at least one airfoil secured with the outer band at an outer joint about the airfoil and with the inner band at an inner joint about the airfoil. The inner band includes a first axial edge portion, a second axial edge portion spaced apart axially from the first edge portion, a first circumferential edge portion, a second circumferential edge portion spaced apart circumferentially from the first circumferential edge portion, an inner band portion surrounding the inner joint, and an inner flange at the first axial edge portion. The method comprises the steps of providing a first vane assembly member comprising the outer band, the at least one airfoil, and an inner band first segment that includes the first axial edge portion, the inner flange, the inner band portion surrounding the inner joint, and at least a portion of each of the first and second circumferential edge portions. The inner band first segment also includes a first segment edge of a selected shape and size, spaced apart axially from the first axial edge portion and extending between and through each of the first and second circumferential edges. Also provided is a second vane assembly member comprising an inner band second segment that includes the second axial edge portion, a second portion of each of the first and second circumferential edge portions, and a second segment edge substantially of the selected shape and size to enable the first and second segments substantially to match in juxtaposition. The second segment edge is spaced apart axially from the second axial edge portion and extends between and through each of the first and second circumferential edges. Together, the inner band first and second segments comprise the inner band of the turbine engine stationary vane assembly. The first and second vane assembly members are held together whereby the first and second segment edges are in juxtaposition across an interface therebetween and bonded at the interface to provide a repaired turbine engine vane assembly.

In another form, the present invention provides a repaired turbine engine stationary vane assembly comprising the above described outer band, inner band radially spaced apart from the outer band, and the at least one airfoil secured with the bands. The repaired vane assembly comprises the first vane assembly member bonded with the second vane assembly member at the first and second segment edges to comprise the inner band.

DETAILED DESCRIPTION OF THE INVENTION

The present invention will be described in connection with one form of, an axial flow gas turbine engine stationary turbine nozzle representing a typical stationary vane assembly. Such an engine comprises, in serial flow communication generally from forward to aft, one or more compressors, a combustion section, and one or more turbine sections disposed axisymmetrically about a longitudinal engine axis. Accordingly, as used herein, phrases using forms of the term "axial" or "axially", for example "axially forward" and "axially aft", refer to relative positions or general directions in respect to the engine axis; phrases using forms of the term "circumferential" refer to general circumferential position or direction generally about the engine axis; and phrases using forms of the term "radial", for example "radially away from", refer to relative radial position or direction generally from the engine axis.

Figure 1:
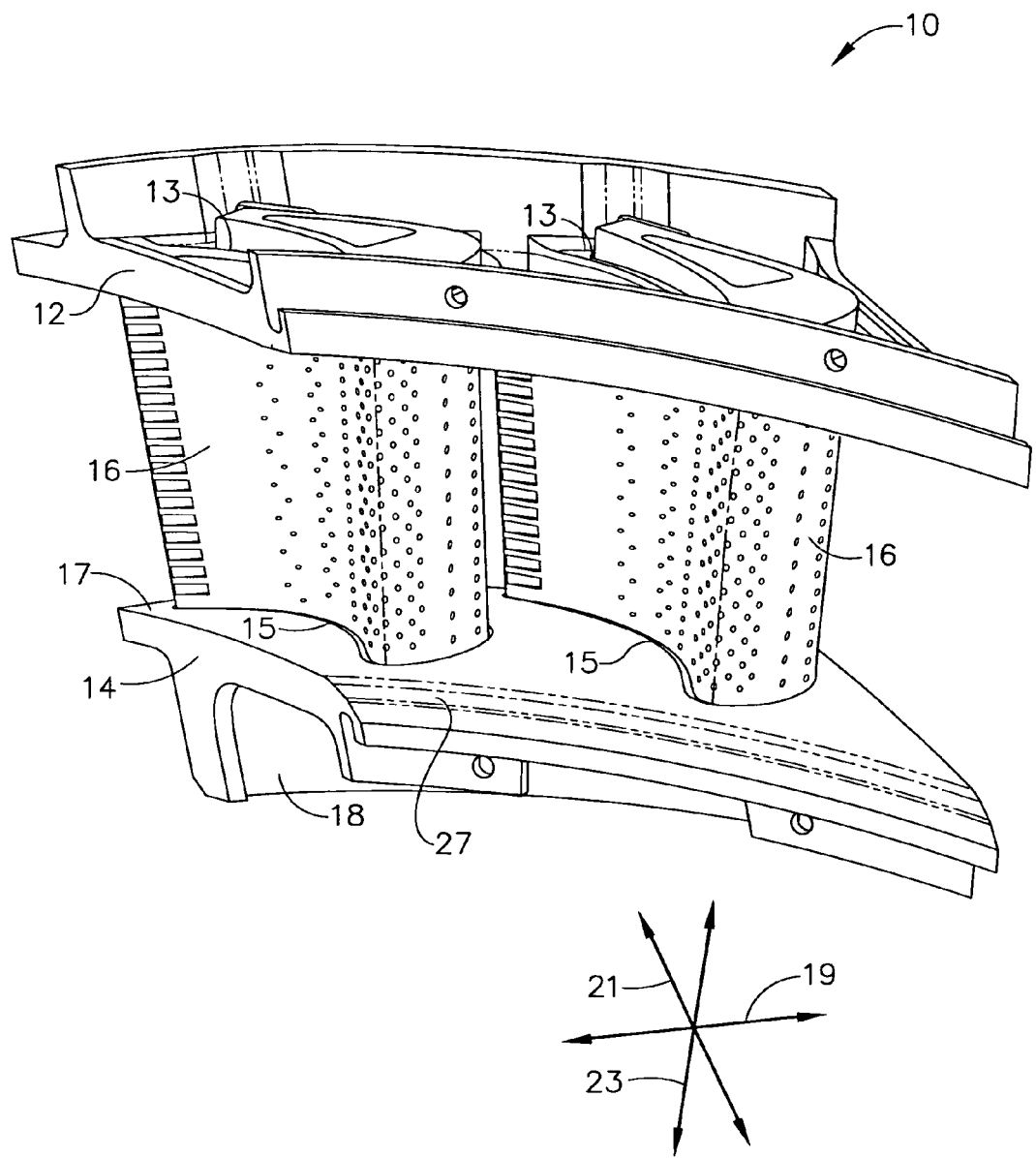
FIG. 1 is a perspective view of a typical gas turbine engine turbine stationary vane assembly.

One current method for repairing a damaged gas turbine engine turbine stationary nozzle or vane assembly, for example resulting from service operation, includes disassembly of the inner and outer bands from the at least one airfoil disposed between the bands. The perspective view of FIG. 1 shows a typical gas turbine engine stationary vane or nozzle assembly generally at 10. Stationary vane assembly 10 includes an outer band 12, an inner band 14 spaced apart from outer band 12 and a plurality, in this embodiment two, airfoils 16 bonded between bands 12 and 14 respectively at outer joints 13 and inner joints 15, each joint about a respective airfoil 16.

Included in the embodiment of stationary turbine vane assembly 10 of FIG. 1, at a first axial edge portion 17 of inner band 14, is a load stop flange 18 extending circumferentially 19 along the axially 21 aft first axial edge portion 17 of inner band 14 and protruding generally radially 23 away from airfoils 16. Inner band 14 also includes a second axial edge portion 27 spaced apart axially 21 from first axial edge portion 17. Generally in original manufacture of inner band 14, prior to its assembly into a turbine nozzle assembly, load stop flange 18 is precision cast as an integral part of inner band 14. In this example, flange 18 functions as a radially inner aft load carrying mounting portion for turbine nozzle assembly 10. As a result of being integral with inner band 14 rather than a separate member bonded with inner band 14, the junction between flange 18 and inner band 14 is more structurally capable of carrying mounting loads. It is desirable in repair of such an assembly to avoid compromise of such structural integrity between flange 18 and inner band 14.

Figure 2:
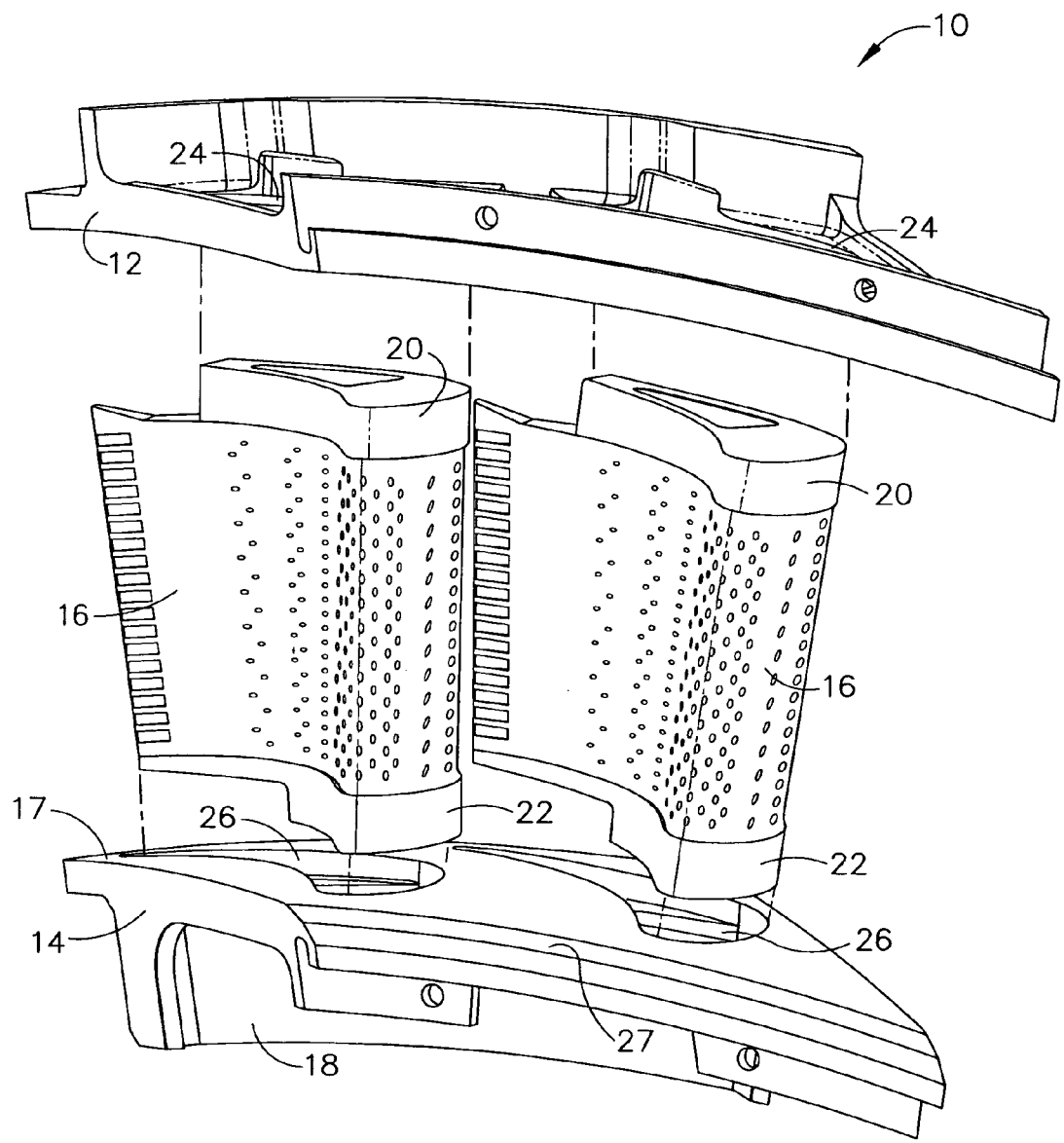
FIG. 2 is an exploded view of the vane assembly of FIG. 1 showing a prior art method of assembling vane members.

An exploded view of the members of turbine vane assembly 10 of FIG. 1 is shown in the perspective view of FIG. 2. During one prior art method for repairing a turbine engine vane assembly damaged during engine service operation, during manufacture or otherwise, outer band 12, inner band 14 and airfoils 16 are disassembled. In FIG. 2, airfoils 16 include airfoil first stub ends 20 and airfoil second stub ends 22 that are disposed respectively in band openings 24 and 26 for registry and bonding with and between bands 12 and 14. After such disassembly, any damaged member is replaced with a new or repaired member and the article is reassembled and bonded at joints 13 and 15 (FIG. 1) for use. In this prior art example, at least four separated bonding joints 13 and 15 are required, for example brazed or welded joints, while the four separate members are secured in relation to one another in accurate design positions. Another repair method can involve a joint in the vicinity of the juncture between inner band 14 and flange 18 in a manner that can compromise the integrity of such juncture. A repaired article using prior art methods can include joint construction not originally designed into the article.

One form of the present invention provides a method for repairing a turbine engine stationary vane assembly without compromising the structural integrity of a joint between the inner band and a connected flange while using fewer distinct members and therefore fewer bonded joints, at a lower repair time and cost. As a result, the repaired turbine engine vane assembly associated with the present invention is easier to produce, has enhanced load carrying structural stability, and maintains improved control of that fluid flow space between the airfoils, sometimes referred to as the nozzle area.

Figure 3:
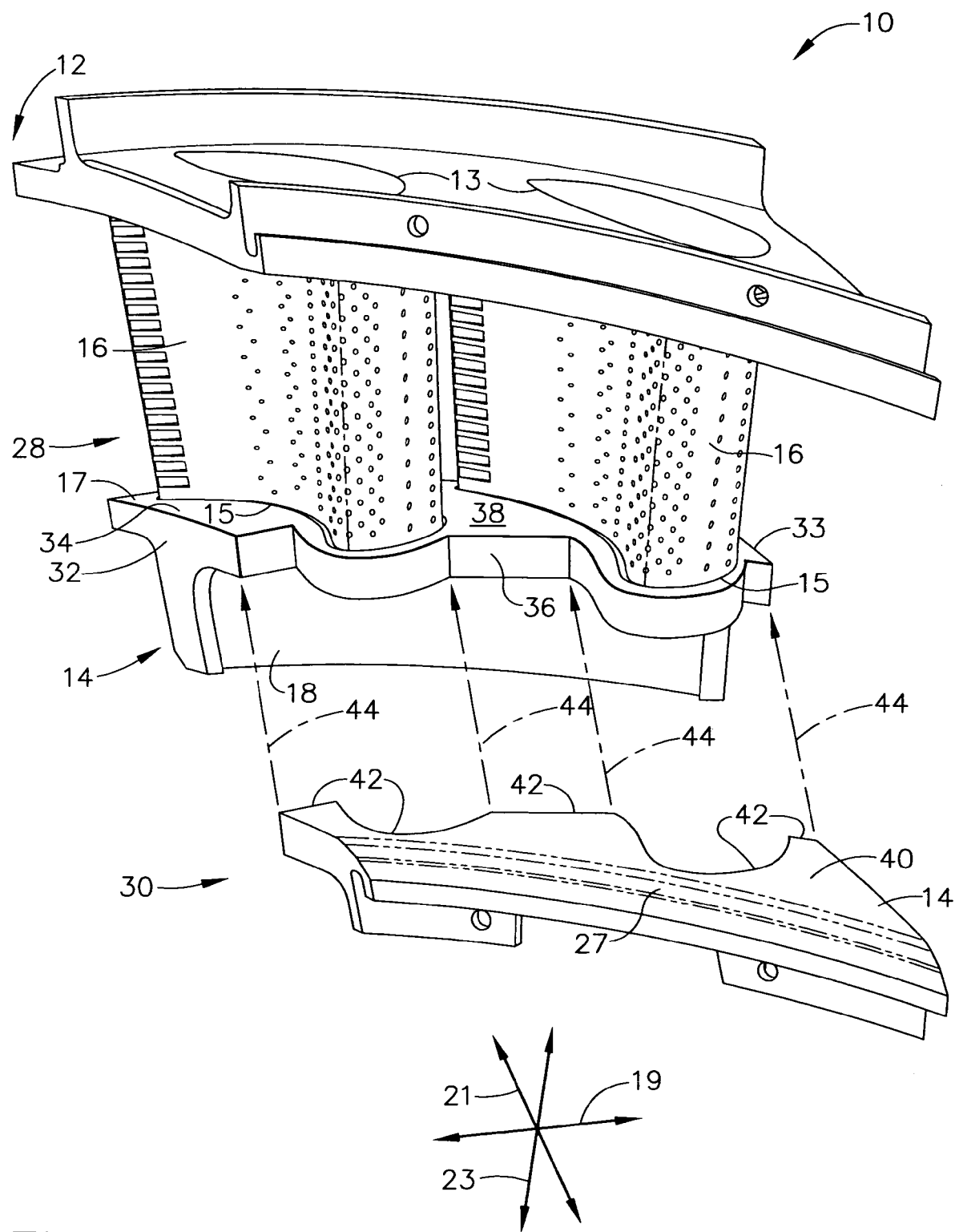
FIG. 3 is an exploded view of an embodiment of a repaired turbine engine stationary vane assembly associated with the present invention.

The perspective, exploded view of FIG. 3 shows members used in connection with a form of the present invention. A first vane assembly member is shown generally at 28 and a second vane assembly member is shown generally at 30.

First vane assembly member 28 comprises outer band 12, bonded with at least one airfoil 16 at outer joint 13, and an inner band first segment 34. Inner band first segment 34 includes a first segment edge 36 spaced apart axially from first axial edge portion 17 and of a selected shape and size, for example as shown in FIG. 3 and selected for convenience of repair, assembly and manufacture. First segment edge 36 is spaced apart from first axial edge portion 17 through inner band portion 38 surrounding inner joints 15 at airfoils 16. In the embodiment of FIG. 3, first segment edge 36 extends generally circumferentially between, through, and includes at least a portion of each of first circumferential edge portion 32 and second circumferential edge portion 33 that is spaced apart circumferentially from first circumferential edge portion 32. First segment 34 is bonded with airfoil 16 at inner joint 15.

Second vane assembly member 30 comprises an inner band second segment 40 including second axial edge portion 27 and a second segment edge 42 substantially of the selected shape and size of first segment edge 36 to enable the first and second segments 34 and 40 to match in juxtaposition. Second segment edge 42 is spaced apart axially from second axial edge portion 27 and extends generally circumferentially between, through, and includes at least a portion of each of first and second circumferential edge portions 32 and 33, respectively. Together, inner band first segment 34 and inner band second segment 40 comprise inner band 14 of turbine engine stationary vane assembly 10.

In the embodiment of FIG. 3, first vane assembly member 28 includes integral load stop flange 18 extending circumferentially 19 along inner band first segment 34 and radially 23 away from airfoils 16. During engine operation, aerodynamic loading is on airfoils 16, and must be transferred through flange 18 to engine structure supporting turbine vane assembly 10. By locating edges 36 and 42 axially spaced apart from flange 18 and first axial edge portion 17, a joint at an interface 44 of such juxtaposed edges 36 and 42 avoids compromise of structural integrity between flange 18 and inner band 14. Thus, an aerodynamic load does not pass through a repair joint that can have a construction not originally designed into turbine vane assembly 10.

First or second vane assembly members 28 or 30 can be provided as a new member or as a useful portion salvaged from a previously manufactured turbine vane assembly to provide a repaired turbine vane assembly 10. Because the bonded joints existing in such a salvaged portion had been accurately controlled during original manufacture, such portion includes joint construction originally designed into the article. When first or second vane assembly members 28 or 30 are provided as new members, improved replacement material can be included to enhance features such as the structural stability and operating life of turbine vane assembly 10. Reducing the number of repair bonded joints provides an article easier to produce and structurally more stable and complete through its load carrying portions.

In one form of the method of the present invention, inner band first segment 34 of first vane assembly member 28 and inner band second segment 40 of second vane assembly member 30 are held together whereby first segment edge 36 and second segment edge 42 are in juxtaposition across interface 44 therebetween. Then the first and second vane assemblies 28 and 30 are bonded at edges 36 and 42, across interface 44, for example by brazing or welding, to provide a repaired turbine engine vane assembly 10.

A form of the present invention provides a repaired vane assembly 10 comprising first vane assembly member 28 bonded with second vane assembly 30 at juxtaposed edges 36 and 42 across interface 44. First vane assembly member 28 included outer band 12, the at least one airfoil 16 and inner band first segment 34, with flange 18 at first axial edge portion 17. Second vane assembly member 30 included inner band second segment 40 and second axial edge portion 27 spaced apart from first axial edge portion 17.

Although the present invention has been described in connection with specific embodiments, structures, and methods, it will be understood that they are intended to be typical and representative of rather than in any way limiting on the scope of the present invention. Those skilled in the various arts involved, for example relating to turbine engines and their design, construction and repair, will understand that the invention is capable of variations and modifications without departing from the scope of the appended claims.

What is claimed is:

1. A method for repairing a turbine engine stationary vane assembly comprising an outer band, an inner band radially spaced apart from the outer band, and at least one airfoil secured with the outer band at an outer joint about the airfoil and with the inner band at an inner joint about the airfoil, the inner band including a first axial edge portion, a second axial edge portion spaced apart axially from the first axial edge portion, a first circumferential edge portion, a second circumferential edge portion spaced apart circumferentially from the first circumferential edge portion, an inner band portion surrounding the inner joint, and an inner flange at the first axial edge portion, comprising the steps of:

providing a first vane assembly member comprising the outer band, the at least one airfoil, and an inner band first segment that includes the first axial edge portion, the inner flange, a first portion of each of the first and second circumferential edge portions, and the inner band portion surrounding the inner joint, the inner band first segment including a first segment edge spaced apart axially from the first axial edge portion and of a selected shape and size, the first segment edge extending between and through each of the first and second circumferential edge portions;

providing a second vane assembly member comprising an inner band second segment that includes the second axial edge portion, a second portion of each of the first and second circumferential edge portions, and a second segment edge substantially of the selected shape and size to enable the inner band first and second segments substantially to match in juxtaposition to comprise the inner band, the second segment edge spaced apart axially from the second axial edge portion and extending between and through each of the first and second circumferential edge portions;

holding the first and second vane assembly members together whereby the first and second segment edges are in juxtaposition across an interface therebetween; and, bonding the first and second vane assembly members at the interface to provide a repaired turbine engine vane assembly.

2. The method of claim 1 in which the first vane assembly includes a plurality of airfoils bonded with the outer band and with the inner band first segment.

3. The method of claim 1 in which the inner band first axial edge portion is axially forward of the inner band second axially edge portion.

4. A repaired turbine engine stationary vane assembly comprising an outer band, an inner band radially spaced apart from the outer band, and at least one airfoil secured with the outer band at an outer joint about the airfoil and with the inner band at an inner joint about the airfoil, the inner band including a first axial edge portion, a second axial edge portion spaced apart axially from the first axial edge portion, a first circumferential edge portion, a second circumferential edge portion spaced apart circumferentially from the first circumferential edge portion, an inner band portion surrounding the inner joint, and an inner flange at the first axial edge portion comprising:

a first vane assembly member comprising the outer band, the at least one airfoil and an inner band first segment that includes the first axial edge portion, the inner flange, a first portion of each of the first and second circumferential edge portions, and the inner band portion surrounding the inner joint, the inner band first segment including a first segment edge extending between and through each of the first and second circumferential edge portions; and, a second vane assembly member comprising an inner band second segment that includes the second axial edge portion, a second portion of each of the first and second circumferential edge portions, and a second segment edge spaced apart axially from the second axial edge portion and extending between and through each of the first and second circumferential edge portions;

the inner band first and second segments being bonded at the first and second segment edges to comprise the inner band.

5. The vane assembly of claim 4 which includes a plurality of airfoils.

6. The vane assembly of claim 4 in which the inner band first axial edge portion is axially forward of the inner band second axially edge portion.

* * * * *